US009239029B2

(12) United States Patent
Herrmann

(10) Patent No.: US 9,239,029 B2
(45) Date of Patent: Jan. 19, 2016

(54) NOZZLE ARRANGEMENT FOR A GAS TURBINE ENGINE

(75) Inventor: Otfrid Herrmann, Bruckmuehl (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 1714 days.

(21) Appl. No.: 12/183,921

(22) Filed: Jul. 31, 2008

(65) Prior Publication Data

US 2009/0031730 A1 Feb. 5, 2009

(30) Foreign Application Priority Data

Aug. 2, 2007 (DE) .................... 10 2007 036 527

(51) Int. Cl.
| F02K 1/36 | (2006.01) |
| F02K 1/46 | (2006.01) |
| F02K 1/82 | (2006.01) |
| F02K 1/34 | (2006.01) |
| F02K 1/38 | (2006.01) |

(52) U.S. Cl.
CPC . *F02K 1/827* (2013.01); *F02K 1/34* (2013.01); *F02K 1/36* (2013.01); *F02K 1/386* (2013.01); *F02K 1/825* (2013.01); *F05D 2250/232* (2013.01); *F05D 2260/96* (2013.01)

(58) Field of Classification Search
USPC .......... 60/262, 264, 770; 239/265.11, 265.17, 239/265.23; 181/213
See application file for complete search history.

(56) References Cited

U.S. PATENT DOCUMENTS

| 3,611,726 A * | 10/1971 | Medawar .................... 60/264 |
| 3,660,982 A * | 5/1972 | Gozlan ...................... 60/230 |
| 3,710,890 A | 1/1973 | True et al. |
| 3,927,522 A * | 12/1975 | Bryce et al. ................. 60/264 |
| 3,990,530 A | 11/1976 | Helfrich et al. |
| 4,372,110 A * | 2/1983 | Fletcher et al. ............. 60/262 |
| 4,566,270 A * | 1/1986 | Ballard et al. .............. 60/264 |
| 4,644,746 A | 2/1987 | Hartman |
| 5,154,052 A | 10/1992 | Giffin, III et al. |
| 5,440,875 A | 8/1995 | Torkelson et al. |
| 2006/0137323 A1* | 6/2006 | Wollenweber .............. 60/39.5 |

FOREIGN PATENT DOCUMENTS

| DE | 41 14 319 A1 | 11/1991 |
| DE | 694 06 370 T2 | 3/1998 |
| EP | 1 674 708 A2 | 6/2006 |
| GB | 1 207 194 A | 9/1970 |

OTHER PUBLICATIONS

French Search Report dated Jul. 30, 2014 with partial English Translation (Six (6) pages).

* cited by examiner

*Primary Examiner* — Steven Sutherland
(74) *Attorney, Agent, or Firm* — Crowell & Moring LLP

(57) ABSTRACT

A nozzle arrangement for a gas turbine engine includes an engine nozzle and an ejector nozzle arranged axially downstream thereof. A gap S is formed between the outlet of the engine nozzle and the inlet of the ejector nozzle, and a flange which reduces the gap S is arranged at the outlet of the engine nozzle.

10 Claims, 1 Drawing Sheet

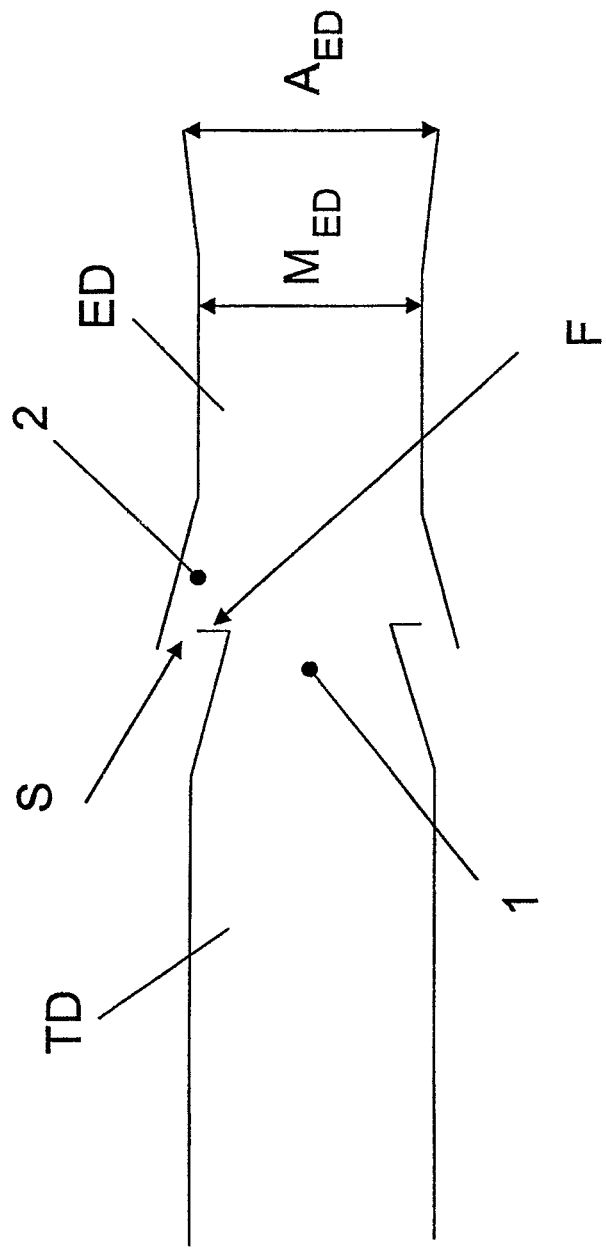

NOZZLE ARRANGEMENT FOR A GAS TURBINE ENGINE

BACKGROUND AND SUMMARY OF THE INVENTION

This application claims the priority of German patent document number 10 2007 036 527.8-13, filed Aug. 2, 2007, the disclosure of which is expressly incorporated by reference herein.

The invention relates to a nozzle arrangement for a gas turbine engine.

During the operation of gas turbine engines, particularly in aircraft, exhaust gases which flow out through the nozzles of the engines are directed through an ejector, for the purposes of noise reduction, infrared blocking and engine compartment exhaust, for example. In the conventional design of nozzle and ejector, aerodynamic vibrations are excited when the airflows merge, resulting in high noise pollution.

To reduce noise in jet engines, the conventional procedure has been to mix the ambient airflow with the jet engine flow in order to reduce its velocity and the associated noises (U.S. Pat. No. 3,710,890). To achieve a great noise reduction, large ejector inlets with pronounced secondary airflows have been used, resulting in an unacceptable loss of thrust at cruising speeds.

In a known noise reducing nozzle for an aircraft gas turbine engine disclosed in German patent document DE 41 14 319 A1, an ejector nozzle receives the exhaust gases from an outlet of a core engine of the aircraft gas turbine engine. A gap is formed between the outlet of the engine nozzle and the inlet of the ejector nozzle, and ambient air flows in through the gap and mixes with the accelerated exhaust gases of the engine. For further noise reduction, during take-off of an aircraft, a plurality of mutually spaced, retractable channel flaps, which are arranged on the ejector nozzle, are deployed into its inner region through which the exhaust gases are directed. The channel flaps thereby reduce the cross-section of the ejector nozzle.

A disadvantage of this arrangement is that moving parts are required in order to achieve the noise reduction. Such parts are extremely susceptible to damage under the high thermal loading by the exhaust gases.

A further noise reducing nozzle and ejector arrangement is disclosed in German patent document DE 694 06 370 T2. In this arrangement, an attempt is made to achieve the noise reduction by specifically influencing the exhaust gas flow on entry into the ejector.

One object of the present invention is to provide a noise reducing ejector nozzle arrangement which prevents the excitation of aerodynamic vibrations, and thus greatly reduces the noise and vibrations.

This and other objects and advantages are achieved by the nozzle arrangement according to the invention, in which an ejector nozzle is arranged axially downstream from the engine nozzle. A gap is formed between the outlet of the engine nozzle and the inlet of the ejector nozzle, with a flange which reduces the width of the gap being arranged at the outlet of the engine nozzle.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic illustration of an engine nozzle and an ejector (mixing chamber) arranged downstream thereof according to the invention.

DETAILED DESCRIPTION OF THE DRAWINGS

As shown in the FIGURE, a gap S is formed between the engine nozzle TD and the ejector ED. This gap S, which is essentially annular, is reduced according to the invention by a flange F fastened to the outlet of the engine nozzle TD. The width of the flange F is in this case expediently 20-50% of the gap S.

The flange F, which is expediently annular, prevents the excitation of aerodynamic vibrations in the ejector nozzle by the confluence of the ambient air through the annular gap S and the exhaust gas from the engine nozzle TD.

Such suppression of the excitation of aerodynamic vibrations in the ejector nozzle ED can expediently be intensified by providing that the inflow of the ambient air through the gap S into the ejector nozzle takes place as far as possible parallel to the inflow of the exhaust gas from the engine nozzle TD into the ejector nozzle ED. For this purpose, according to one embodiment of the invention, the engine nozzle TD has a conical outlet region 1 and the ejector nozzle has a conical inlet region 2, with the cone of the outlet region 1 of the engine nozzle TD corresponding to the cone of the inlet region 2 of the ejector nozzle ED. In other words, the converging section 2 of the ejector nozzle ED has the same taper angle (expediently between)10-20° as the converging section 1 of the engine nozzle TD.

The exhaust gas from the engine nozzle is thus blown into the converging part 2 of the ejector nozzle.

In a further advantageous configuration of the invention, the outlet of the engine nozzle is situated downstream behind the inlet of the ejector nozzle. As a result, the inflow of the ambient air through the gap S into the region for the mixing of the ambient air with the exhaust gas inside the ejector nozzle is improved.

For further reduction of the noise, the inner surface of the ejector nozzle is lined with sound-absorbing material.

In a further embodiment of the invention, the outlet region of the ejector nozzle has a diverging course, with the throughflow cross-section $A_{ED}$ of the outlet region of the ejector nozzle ED being greater than the throughflow cross-section $M_{ED}$ of the central region.

The nozzle arrangement according to the invention, can reduce the noise level of a conventional ejector arrangement by up to 30 dB, which corresponds to a reduction of the sound pressure to about $\frac{1}{1000}$ of the original value without employing the measures according to the invention.

In addition, the ejector wall temperature is lowered by the invention, thereby reducing the infrared signature of the engine exhaust gas region.

The invention can be used in exhaust gas ejectors of turboprop engines (e.g., in the A400M), or in ejectors on auxiliary gas turbines (e.g., in the Eurofighter) or in ejector nozzles of unmanned aircraft.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A nozzle arrangement for a gas turbine engine, said nozzle arrangement comprising:
   an engine nozzle;
   an ejector nozzle arranged to receive a downstream gas flow that exits the engine nozzle;
   a gap formed between an outlet of the engine nozzle and an inlet of the ejector nozzle; and
   a flange which reduces the gap, and is arranged at a downstream extremity of the engine nozzle, around a periphery of an opening of said outlet of the engine nozzle, and extends radially outward therefrom, wherein the flange is arranged in an inlet region of the ejector nozzle.

2. The nozzle arrangement according to claim 1, wherein:
   the engine nozzle has a conical outlet region;
   the inlet region of the ejector nozzle is conical; and
   a conical course of an outlet region of the engine nozzle corresponds to a conical course of the inlet region of the ejector nozzle.

3. The nozzle arrangement according to claim 1, wherein an inner surface of the ejector nozzle is lined with a sound-absorbing material.

4. The nozzle arrangement according to claim 1, wherein:
   the outlet region of the ejector nozzle has a conical course;
   a throughflow cross-section of an outlet region of the ejector nozzle is greater than a throughflow cross-section of a central region of the ejector nozzle.

5. An exhaust arrangement for a gas turbine engine, said exhaust arrangement comprising:
   an engine nozzle having a frustoconical shaped outlet region that decreases in cross sectional area in a direction of gas flow;
   an ejector nozzle that is disposed to receive a downstream gas flow that exits said engine nozzle, and has an inlet with a frustoconical shape that corresponds substantially to a shape of the engine nozzle;
   a radially extending annular gap formed between an outlet of the engine nozzle and said inlet of the ejector nozzle; and
   an annular flange formed on a downstream extremity of the engine nozzle and extending radially outward therefrom into the radially extending annular gap so as to reduce a cross sectional area of said radially extending annular gap wherein the annular flange is arranged in a region of the inlet of the ejector nozzle.

6. The exhaust arrangement according to claim 5, wherein said outlet of said engine nozzle is situated downstream of said inlet of said ejector nozzle.

7. The exhaust arrangement according to claim 5, wherein:
   the flange includes a first end terminating at the downstream extremity of the engine nozzle and an opposing second end terminating in the gap;
   the flange linearly extends between the first end and the opposing second end; and the opposing second end of the flange faces an interior portion of the ejector closest to the second end.

8. The exhaust arrangement according to claim 7, wherein a side of the flange facing an outlet of the ejector nozzle is parallel to the outlet of the ejector nozzle.

9. A nozzle arrangement for a gas turbine engine, said nozzle arrangement comprising:
   an engine nozzle;
   an ejector nozzle arranged to receive a downstream gas flow that exits the engine nozzle;
   a gap formed between an outlet of the engine nozzle and an inlet of the ejector nozzle; and
   a flange which reduces the gap, and is arranged at a downstream extremity of the engine nozzle, around a periphery of an opening of said outlet, and extends radially outward therefrom, wherein the flange is arranged in an inlet region of the ejector nozzle, wherein
      the flange includes a first end terminating at the downstream extremity of the engine nozzle and an opposing second end terminating in the gap;
      the flange linearly extends between the first end and the opposing second end; and
      the opposing second end of the flange faces an interior portion of the ejector closest to the opposing second end.

10. The nozzle arrangement according to claim 9, wherein a side of the flange facing an outlet of the ejector nozzle is parallel to the outlet of the ejector nozzle.

* * * * *